United States Patent
Zeng et al.

(10) Patent No.: US 12,092,912 B2
(45) Date of Patent: Sep. 17, 2024

(54) VIEWING ANGLE WIDENING FILM, MANUFACTURING METHOD THEREOF, AND DISPLAY DEVICE

(71) Applicant: TCL CHINA STAR OPTOELECTRONICS TECHNOLOGY CO., LTD., Shenzhen (CN)

(72) Inventors: Guang Zeng, Shenzhen (CN); Yue Wang, Shenzhen (CN); Yuan Shao, Shenzhen (CN); Fang Tan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/990,306

(22) Filed: Nov. 18, 2022

(65) Prior Publication Data
US 2024/0061283 A1 Feb. 22, 2024

(30) Foreign Application Priority Data
Aug. 18, 2022 (CN) .......................... 202210991613.0

(51) Int. Cl.
G02F 1/13 (2006.01)
B82Y 20/00 (2011.01)
G02B 5/02 (2006.01)
G02F 1/1335 (2006.01)

(52) U.S. Cl.
CPC ............ G02F 1/1323 (2013.01); G02B 5/02 (2013.01); G02F 1/133502 (2013.01); G02F 1/133504 (2013.01); G02F 1/133528 (2013.01); B82Y 20/00 (2013.01); G02B 2207/101 (2013.01)

(58) Field of Classification Search
CPC ........................ G02F 1/1323; G09G 2320/068
See application file for complete search history.

(56) References Cited

U.S. PATENT DOCUMENTS

| | | | |
|---|---|---|---|
| 2005/0270654 A1* | 12/2005 | Goto .................. | G02B 19/0028 359/626 |
| 2008/0198446 A1* | 8/2008 | Asakura ................. | G02B 5/208 359/359 |
| 2009/0180191 A1* | 7/2009 | Yamada .................. | G02B 3/06 359/625 |
| 2018/0045876 A1* | 2/2018 | Lee ................... | G02F 1/133528 |

FOREIGN PATENT DOCUMENTS

JP 2008233824 A * 10/2008

OTHER PUBLICATIONS

English translation for JP-2008233824-A, Matsuno (Year: 2008).*

* cited by examiner

*Primary Examiner* — Jonathan Y Jung
(74) *Attorney, Agent, or Firm* — PV IP PC; Wei Te Chung

(57) ABSTRACT

A viewing angle widening film, a manufacturing method thereof, and a display device are provided. A first film layer of the viewing angle widening film includes protrusions spaced apart from each other and extended along a first direction. The protrusions include a first protrusion and a second protrusion arranged on a side of the first protrusion away from a flat layer, a surface of the second protrusion on a side away from the flat layer is an arc surface, and a diffusion effect of the second protrusion is weaker than that of the first protrusion.

19 Claims, 4 Drawing Sheets

VIEWING ANGLE WIDENING FILM, MANUFACTURING METHOD THEREOF, AND DISPLAY DEVICE

CROSS-REFERENCE TO RELATED APPLICATIONS

Pursuant to 35 U.S.C. § 119 and the Paris Convention Treaty, this application claims priority to Chinese Patent Application No. 202210991613.0, filed on Aug. 18, 2022, titled "VIEWING ANGLE WIDENING FILM, MANUFACTURING METHOD THEREOF, AND DISPLAY DEVICE", disclosure of which is incorporated herein by reference in its entirety.

FIELD

The present application relates to a field of display technology and particularly relates to a viewing angle widening film, a manufacturing method thereof, and a display device.

INTRODUCTION

Liquid crystal displays (LCDs) include liquid crystal materials as their basic components. The liquid crystal material is filled between two parallel plates, and the alignment of the molecules inside the liquid crystal material is controlled by voltage, which achieves the purpose of shading and light transmission to display well-proportioned images. Furthermore, as long as a filter layer of three primary colors is added between the two parallel plates, a display of color images can be realized.

Currently, vertical alignment (VA-type) liquid crystal displays have the advantages of high contrast ratio, bright colors, and fast response times, and are widely used in consumer electronic products such as televisions. Nevertheless, the viewing angles of the VA-type liquid crystal displays are not as good as that of the in-plane switching (IPS) type liquid crystal displays.

Currently, the viewing angles of the VA-type liquid crystal displays are improved by multi-domain pixels, but the improvement effect of this method is not significant. To further expand the viewing angles of the VA-type liquid crystal displays, a viewing angle widening film is currently manufactured by a method of mold imprinting. The brightness of the conventional viewing angle widening film at a viewing angle of 0° is low. Because the manufacturing of a mold is expensive, the mold needs to be remanufactured every time a product is renewed, resulting in a high cost of the method of mold imprinting, which limits the application of the current viewing angle widening film. In addition, super-sized (above 110 inches) liquid crystal displays are a future development trend, and it is difficult to manufacture super-sized viewing angle widening films due to the size limitation of the mold.

SUMMARY

An object of the present invention is to provide a viewing angle widening film, a manufacturing method thereof, and a display device. It can solve the problems in the prior art of low brightness of the viewing angle widening film when the viewing angle is 0°, high cost of mold imprinting solution, and inability to manufacture large-sized viewing angle widening films.

In order to solve the above problems, the present invention provides a viewing angle widening film, which includes: a first film layer including a flat layer and protrusions arranged on the flat layer spaced apart from each other, wherein the protrusions extend along a first direction, each protrusion includes a first protrusion and a second protrusion, the second protrusion is arranged on a side of the first protrusion away from the flat layer, and a surface of the second protrusion on a side away from the flat layer is an arc surface; and a second film layer covering the flat layer and the protrusions, wherein a refractive index of the second film layer is greater than a refractive index of the first film layer.

Further, on a cross-section perpendicular to the first direction, a shape of the first protrusion is a trapezoid, a length of an upper bottom of the first protrusion away from the flat layer ranges from 5 micrometers to 40 micrometers, a length of a lower bottom of the first protrusion connecting the flat layer ranges from 8 micrometers to 50 micrometers, a height of the first protrusion ranges from 5 micrometers to 30 micrometers, and angles of two lower bottom corners of the first protrusion are both greater than 0° and less than 75°.

Further, the second protrusion is directly connected with the first protrusion, and on the cross-section perpendicular to the first direction, a height of the second protrusion ranges from 1 micrometer to 20 micrometers, and the length of the upper bottom of the first protrusion is greater than the height of the second protrusion.

Further, a minimum distance between the arc surface of the second protrusion and a surface of the second film layer on a side away from the flat layer ranges from 5 micrometers to 30 micrometers.

Further, the refractive index of the first film layer ranges from 1.3 to 1.6, and the refractive index of the second film layer ranges from 1.5 to 1.9.

Further, light transmittance of the first film layer and light transmittance of the second film layer both range from 60% to 95%.

Further, the first film layer and/or the second film layer further include scattering particles, shapes of the scattering particles are spherical, and diameters of the scattering particles range from 0.05 micrometers to 2 micrometers.

Further, a material of the second film layer includes a second resin, and the second film layer further includes refractive index adjusting particles, and wherein a refractive index of the refractive index adjusting particles is greater than a refractive index of the second resin, and diameters of the refractive index adjusting particles range from 1 nanometer to 40 nanometers.

In order to solve the above problems, the present invention further provides a manufacturing method of a viewing angle widening film, which includes following steps: providing a substrate; forming a first film layer on the substrate, wherein the first film layer includes a flat layer and protrusions arranged on the flat layer spaced apart from each other, and the protrusions extend along a first direction, and wherein each protrusion includes a first protrusion and a second protrusion, the second protrusion is arranged on a side of the first protrusion away from the flat layer, and a surface of the second protrusion on a side away from the flat layer is an arc surface; and forming a second film layer on the flat layer and the protrusions, wherein a refractive index of the second film layer is greater than a refractive index of the first film layer.

In order to solve the above problems, the present invention further provides a display device, which includes: a display panel; a polarizer arranged on the display panel; and a viewing angle widening film, wherein the viewing angle widening film is arranged between the display panel and the polarizer or is arranged on a surface of the polarizer facing away from the display panel.

Further, the viewing angle widening film includes: a first film layer including a flat layer and protrusions arranged on the flat layer spaced apart from each other, wherein the protrusions extend along a first direction, each protrusion includes a first protrusion and a second protrusion, the second protrusion is arranged on a side of the first protrusion away from the flat layer, and a surface of the second protrusion on a side away from the flat layer is an arc surface; and a second film layer covering the flat layer and the protrusions, wherein a refractive index of the second film layer is greater than a refractive index of the first film layer.

Further, the second protrusion is directly connected with the first protrusion, and on a cross-section perpendicular to the first direction, a height of the second protrusion ranges from 1 micrometer to 20 micrometers, and a length of an upper bottom of the first protrusion is greater than the height of the second protrusion.

Further, on the cross-section perpendicular to the first direction, a shape of the first protrusion is a trapezoid, the length of the upper bottom of the first protrusion away from the flat layer ranges from 5 micrometers to 40 micrometers.

Further, on the cross-section perpendicular to the first direction, a length of a lower bottom of the first protrusion connecting the flat layer ranges from 8 micrometers to 50 micrometers.

Further, on the cross-section perpendicular to the first direction, a height of the first protrusion ranges from 5 micrometers to 30 micrometers, and angles of two lower bottom corners of the first protrusion are both greater than 0° and less than 75°.

Further, a minimum distance between the arc surface of the second protrusion and a surface of the second film layer on a side away from the flat layer ranges from 5 micrometers to 30 micrometers.

Further, the refractive index of the first film layer ranges from 1.3 to 1.6, and the refractive index of the second film layer ranges from 1.5 to 1.9.

Further, light transmittance of the first film layer and light transmittance of the second film layer both range from 60% to 95%.

Further, the first film layer and/or the second film layer further include scattering particles, shapes of the scattering particles are spherical, and diameters of the scattering particles range from 0.05 micrometers to 2 micrometers.

Further, a material of the second film layer includes a second resin, and the second film layer further includes refractive index adjusting particles, and wherein a refractive index of the refractive index adjusting particles is greater than a refractive index of the second resin, and diameters of the refractive index adjusting particles range from 1 nanometer to 40 nanometers.

A first film layer of a viewing angle widening film provided by the present invention includes protrusions spaced apart from each other and extended along a first direction. The protrusions include a first protrusion and a second protrusion arranged on a side of the first protrusion away from the flat layer, and a surface of the second protrusion on a side away from the flat layer is an arc surface. The angles between a tangent of the arc surface of the second protrusion on the side away from the flat layer and a plane of the second protrusion on a side close to the flat layer are less than the angles of a lower bottom corner of the first protrusion. The diffusion effect of the second protrusions is weaker than that of the first protrusions, so the brightness when the viewing angles of the viewing angle widening film is 0° can be improved.

The viewing angle widening film is manufactured by a coating process, and various sizes of the viewing angle widening films can be manufactured according to the needs of users, which meets the user's demand for large-sized viewing angle widening film. When manufacturing viewing angle widening films of different sizes, there is no need to replace coating equipment, thereby reducing costs.

Further areas of applicability will become apparent from the description provided herein. The description and specific examples in this summary are intended for purposes of illustration only and are not intended to limit the scope of the present disclosure.

DRAWINGS

To illustrate the technical solutions in the embodiments of the present application more clearly, the following briefly introduces the drawings that need to be used in the description of the embodiments. The drawings described herein are for illustrative purposes only of selected embodiments and not all possible implementations, and are not intended to limit the scope of the present disclosure. For one skill in the art, other drawings can be obtained from these drawings without paying creative effort.

Figure 1:
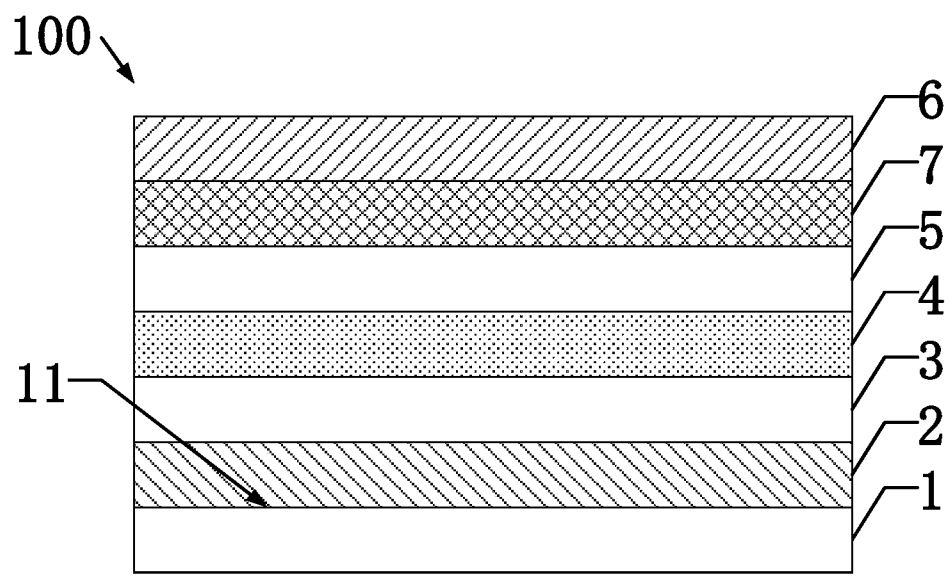
FIG. 1 is a schematic structural diagram of a display device according to Embodiment 1 of the present invention.

REFERENCE NUMERALS display device 100, backlight module 1, first polarizer 2, array substrate 3, liquid crystal layer 4, color filter substrate 5, polarizer 6, viewing angle widening film 7, first film layer 71, second film layer 72, flat layer 711, protrusion 712, light incident surface 7111, light-emitting surface 7112, first protrusion 7121, second protrusion 7122.

DETAILED DESCRIPTION

The preferred embodiments of the present invention will be described in detail with reference to the drawings in order to fully introduce the technical content of the present invention. Examples are given to prove that the present invention can be implemented to make the technical content disclosed in the present invention clearer and to make it easier for one skill in the art to understand how to implement the present invention. However, the present invention may be embodied in many different forms of embodiment. The protection scope of the present invention is not limited to the embodiments mentioned in the specification, and the description of the following embodiments is not intended to limit the scope of the present invention.

The directional terms mentioned in the present invention, such as "up", "down", "front", "rear", "left", "right", "inside", "outside", "side", etc., are only the directions in the drawings, and the directional terms used herein are used to explain and describe the present invention, rather than to limit the protection scope of the present invention.

In the drawings, structurally identical components are denoted by the same numerals, and structurally or functionally similar components are denoted by similar numerals. In addition, for ease of understanding and description, the size and thickness of each component shown in the drawings are arbitrarily shown, and the present invention does not limit the size and thickness of each component.

Embodiment 1

As shown in FIG. 1, this embodiment provides a display device 100. The display device 100 includes a display panel. The display panel includes a backlight module 1, a first polarizer 2, an array substrate 3, a liquid crystal layer 4, and a color filter substrate 5.

The backlight module 1 has a light-emitting side 11. The backlight module 1 includes a light source (not shown), an optical film (not shown), a reflective sheet (not shown), and other film layers. The light source may be a direct illumination-type light source or an edge illumination-type light source.

The first polarizer 2 is arranged on the light-emitting side 11 of the backlight module 1. The basic structure of the first polarizer 2 includes polyvinyl alcohol film (PVA film) and triacetate cellulose film (TAC film) respectively arranged on both sides of the PVA film, wherein the PVA film plays the role of polarization. The PVA film is easily hydrolyzed. To protect the physical properties of the polarizing film, the TAC films with high light transmittance, good water resistance, and certain mechanical strength are arranged on both sides of the PVA film for protection.

The array substrate 3 is disposed on the side of the first polarizer 2 away from the backlight module 1. The array substrate 3 includes a thin film transistor device (not shown), a first alignment film (not shown), and other film layer structures.

The color filter substrate 5 is disposed opposite to the array substrate 3 and is located on the side of the array substrate 3 away from the backlight module 1. The color filter substrate 5 includes a second alignment film (not shown), a color filter (not shown), a black matrix (not shown), and other film structures.

The liquid crystal layer 4 is disposed between the array substrate 3 and the color filter substrate 5.

The display device 100 further includes a polarizer 6 and a viewing angle widening film 7.

Wherein, the polarizer 6 is arranged on the display panel. Specifically, the polarizer 6 is disposed on the side of the color filter substrate 5 away from the backlight module 1. The basic structure of the polarizer 6 includes: polyvinyl alcohol (PVA) film and a triacetate cellulose (TAC) film respectively disposed on both sides of the PVA film, wherein the PVA film plays a polarizing role. The PVA film is easily hydrolyzed. To protect the physical properties of the polarizing film, layers of (TAC) film with high light transmittance, good water resistance, and certain mechanical strength are arranged on both sides of the PVA film for protection. Wherein, the polarization direction of polarizer 6 is perpendicular to the polarization direction of the first polarizer 2.

In this embodiment, the viewing angle widening film 7 is disposed between the color filter substrate 5 and the polarizer 6. In other embodiments, the viewing angle widening film 7 may also be disposed on the side of the polarizer 6 away from the backlight module 1.

Figure 2:
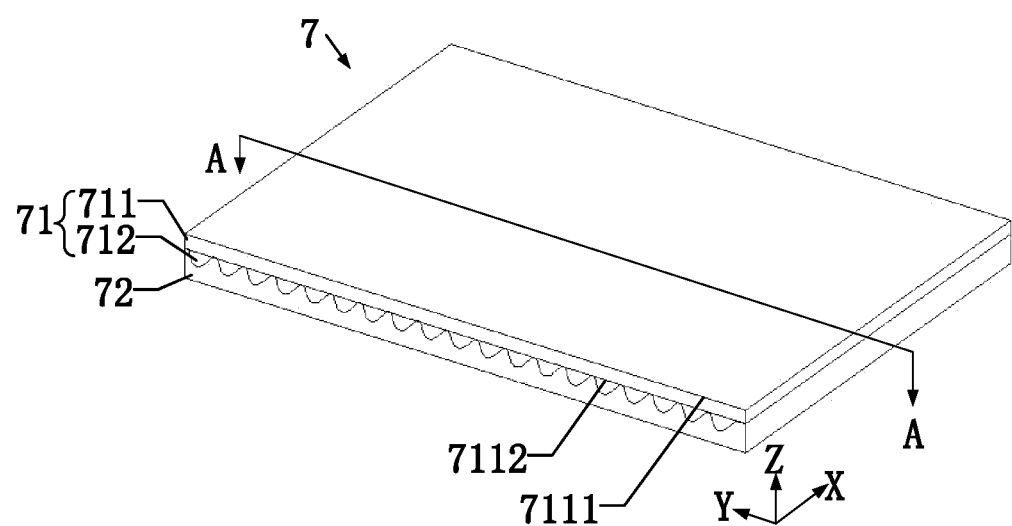
FIG. 2 is a schematic structural diagram of a viewing angle widening film of Embodiment 1 of the present invention.
Figure 3:
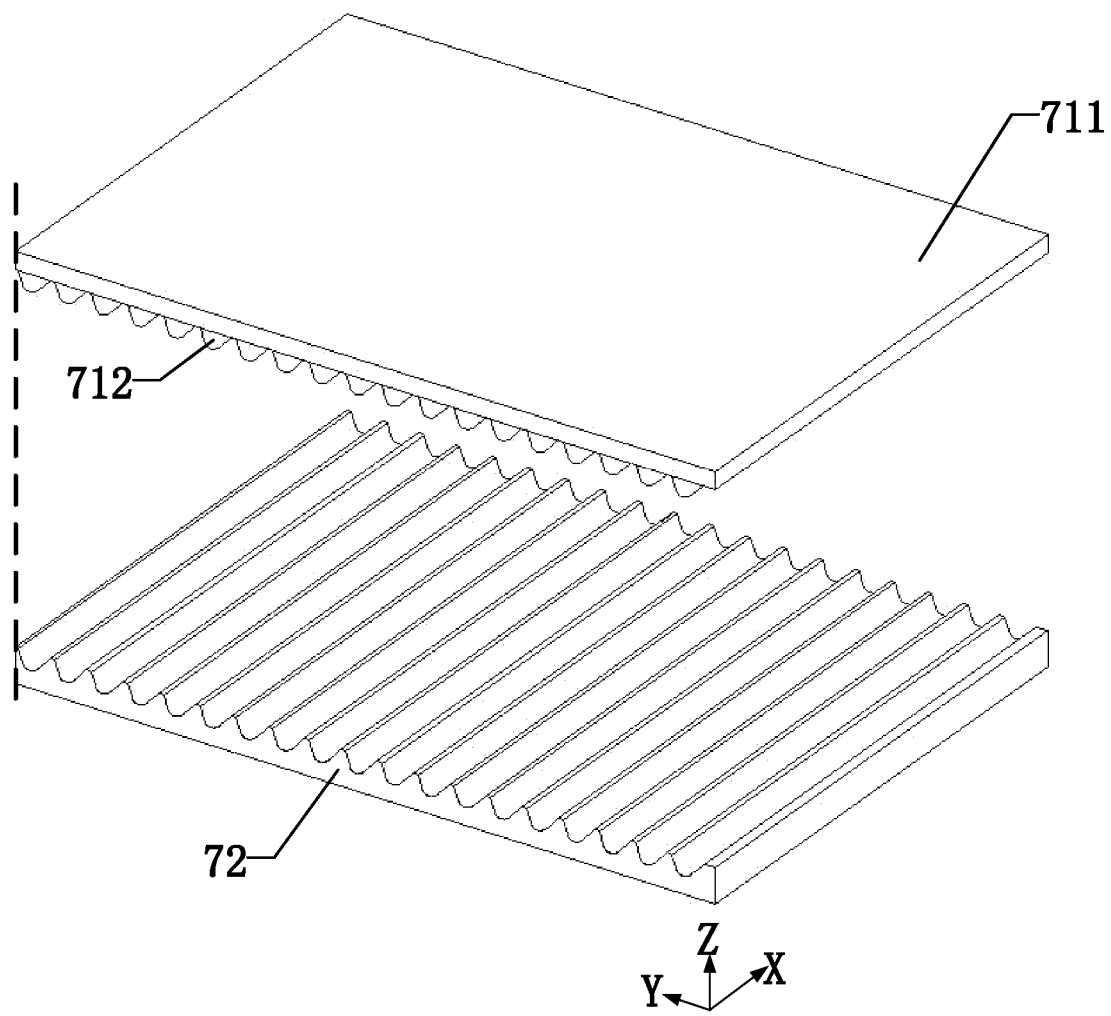
FIG. 3 is an exploded view of the viewing angle widening film of FIG. 2.
Figure 4:
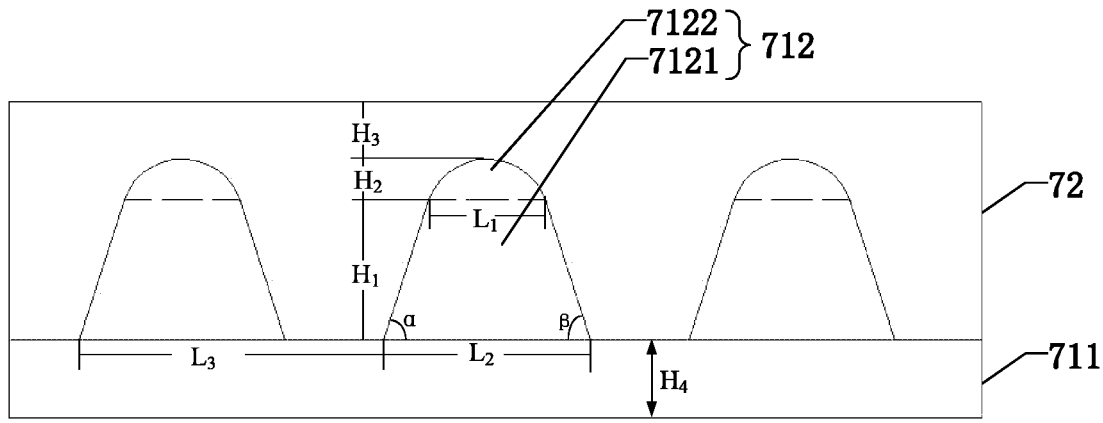
FIG. 4 is a sectional view of an A-A section in FIG. 2.

As shown in FIG. 2, FIG. 3, and FIG. 4, the viewing angle widening film 7 includes a first film layer 71 and a second film layer 72.

The material of the first film layer 71 includes the first resin. In this embodiment, the material of the first film layer 71 is light-transmitting resin. The material of the first film layer 71 can be either a positive photoresist or a negative photoresist. The refractive index of the first film layer 71 ranges from 1.3 to 1.6. In this embodiment, the refractive index of the first film layer 71 is 1.4.

The light transmittance of the first film layer 71 ranges from 60% to 95%. If the light transmittance of the first film layer 71 is less than 60%, the overall brightness of the display device 100 will decrease. In this embodiment, the light transmittance of the first film layer 71 is 90%.

In other embodiments, the first film layer 71 further includes a plurality of scattering particles. The diffusion effect of the viewing angle widening film 7 is enhanced by using the scattering particles. The scattering particles are preferably spherical scattering particles, the diameter of the scattering particles ranges from 0.05 micrometers to 2 micrometers, and the content of the scattering particles ranges from 1% to 30%. The material of the scattering particles can be selected from inorganic materials such as silica, titanium dioxide, barium sulfate, calcium carbonate, zirconium dioxide, etc. It can also be selected from organic particulate materials such as polymethyl methacrylate (PMMA) particles, polycarbonate (PC) particles, or polystyrene (PS) particles.

The first film layer 71 includes a flat layer 711 and a plurality of protrusions 712 disposed on the flat layer 711 spaced apart from each other.

The flat layer 711 has a light incident surface 7111 and a light-emitting surface 7112 arranged opposite to each other. The flat layer 711 mainly provides a flat surface for the fabrication of the protrusions 712 thereon. The material of the flat layer 711 may be the same as the material of the protrusions 712, so that light can directly pass through the flat layer 711 to illuminate the protrusions 712. The thickness H4 of the flat layer 711 ranges from 2 micrometers to 20 micrometers. In this embodiment, the thickness H4 of the flat layer 711 is 5 micrometers.

As shown in FIG. 4, the protrusions 712 extend along the first direction X. Each of the protrusions 712 includes a first protrusion 7121 and a second protrusion 7122.

The second protrusion 7122 is disposed on the side of the first protrusion 7121 away from the flat layer 711, and the surface of the second protrusion 7122 on the side away from the flat layer 711 is an arc surface. In this embodiment, the second protrusion 7122 is directly connected with the first protrusion 7121. Specifically, in this embodiment, the surface of the first protrusion 7121 on the side away from the flat layer 711 and the surface of the second protrusion 7122 on the side close to the flat layer 711 is the same plane parallel to the flat layer 711. In other embodiments, the second protrusion 7122 may also be indirectly connected to the first protrusion 7121, and the surface of the side of the first protrusion 7121 away from the flat layer 711 may also be a curved surface. The angles between the tangent of the arc surface of the second protrusion 7122 away from the flat layer 711 and the plane of the second protrusion 7122 close to the flat layer 711 are less than the angles of the lower bottom corner of the first protrusion 7121. The diffusion effect of the second protrusion 7122 is weaker than that of the first protrusion 7121. Therefore, the brightness when the viewing angles of the viewing angle widening film 7 is 0° can be improved.

As shown in FIG. 4, on a cross-section perpendicular to the first direction X, the shape of the first protrusion 7121 is a trapezoid, a length L1 of an upper bottom of the first protrusion 7121 away from the flat layer 711 ranges from 5 micrometers to 40 micrometers, a length L2 of a lower bottom of the first protrusion 7121 connecting the flat layer 711 ranges from 8 micrometers to 50 micrometers, and a height of the first protrusion 7121 ranges from 5 micrometers to 30 micrometers. In this embodiment, on the cross-section perpendicular to the first direction X, the length L1 of the upper bottom of the first protrusion 7121 is 8 micrometers, the length L2 of the lower bottom of the first protrusion 7121 is 20 micrometers, and the height H1 of the first protrusion 7121 is 12 micrometers.

As shown in FIG. 4, on a cross-section perpendicular to the first direction X, the angles of two lower bottom corners of the first protrusion 7121 are both greater than 0° and less than 75°. In this embodiment, on the cross-section perpendicular to the first direction X, the included angle α between one side wall of the first protrusion 7121 and the lower bottom is 65°, and the included angle θ between the other side wall of the first protrusion 7121 and the lower bottom is 65°.

As shown in FIG. 4, on a cross-section perpendicular to the first direction X, the length of a bottom edge of a side of the second protrusion 7122 close to the flat layer 711 is equal to the length of the upper bottom of the first protrusion 7121. The height H2 of the second protrusion 7122 ranges from 1 micrometer to 20 micrometers. In this embodiment, the height H2 of the second protrusion 7122 is 4 micrometers. Specifically, the width H2 of the second protrusion 7122 refers to a maximum distance between the arc surface of the second protrusion 7122 on the side away from the flat layer 711 and the surface of the second protrusion 7122 on the side close to the flat layer 711. The length L1 of the upper bottom of the first protrusion 7121 is greater than the height H2 of the second protrusion 7122. In this way, the process difficulty of the protrusions 712 can be reduced, and a smoother second protrusion 7122 can be manufactured.

As shown in FIG. 4, a minimum distance H3 between the arc surface of the second protrusion 7122 and a surface of the second film layer 72 on a side away from the flat layer 711 ranges from 5 micrometers to 30 micrometers. In this embodiment, the minimum distance H3 between the arc surface of the second protrusion 7122 and the surface of the second film layer 72 on the side away from the flat layer 711 is 6 micrometers.

As shown in FIG. 4, on a cross-section perpendicular to the first direction X, the length L3 (distance) between two adjacent first protrusions 7121 plus the length of the lower base of the first protrusion 7121 ranges from 10 micrometers to 50 micrometers. In this embodiment, on the cross-section perpendicular to the first direction X, the length L3 between two adjacent first protrusions 7121 plus the length of the lower base of the first protrusion 7121 is 30 micrometers.

As shown in FIG. 2, FIG. 3, and FIG. 4, the second film layer 72 covers the flat layer 711 and the protrusions 712.

The refractive index of the second film layer 72 is greater than the refractive index of the first film layer 71. The difference between the refractive index of the second film layer 72 and the refractive index of the first film layer 71 ranges from 0 to 0.3. The refractive index of the second film layer 72 ranges from 1.5 to 1.9. In this embodiment, the refractive index of the second film layer 72 is 1.6, and the difference between the refractive index of the second film layer 72 and the refractive index of the first film layer 71 is 0.2.

Wherein, the light transmittance of the second film layer 72 ranges from 60% to 95%. If the light transmittance of the second film layer 72 is less than 60%, the overall brightness of the display device 100 will decrease. In this embodiment, the light transmittance of the second film layer 72 is 90%.

In other embodiments, the second film layer 72 further includes a plurality of scattering particles. The diffusion effect of the viewing angle widening film 7 is enhanced by the scattering particles. The scattering particles are preferably spherical scattering particles, the diameters of the scattering particles range from 0.05 μm to 2 μm, and the content of the scattering particles ranges from 1% to 30%. The material of the scattering particles can be selected from inorganic materials such as silicon dioxide, titanium dioxide, barium sulfate, calcium carbonate, zirconium dioxide, etc. It can also be selected from organic materials such as polymethyl methacrylate (PMMA) particles, polycarbonate (PC) particles, and polystyrene (PS) particles.

The material of the second film layer 72 includes the second resin. In this embodiment, the material of the second film layer 72 is light-transmitting resin. The material of the second film layer 72 includes one or more of epoxy acrylate, urethane acrylate, polyester acrylate, pure acrylate, silicone oligomer, photocurable polybutadiene, or organic-inorganic hybrid resin.

The second film layer 72 further includes a plurality of refractive index adjusting particles (not shown). The refractive index of the refractive index adjusting particles is greater than the refractive index of the second resin, and the diameter of the refractive index adjusting particles ranges from 1 nanometer to 40 nanometers. In this way, the refractive index of the second film layer 72 can be increased so that the refractive index of the second film layer 72 can reach an ideal value.

Figure 5:
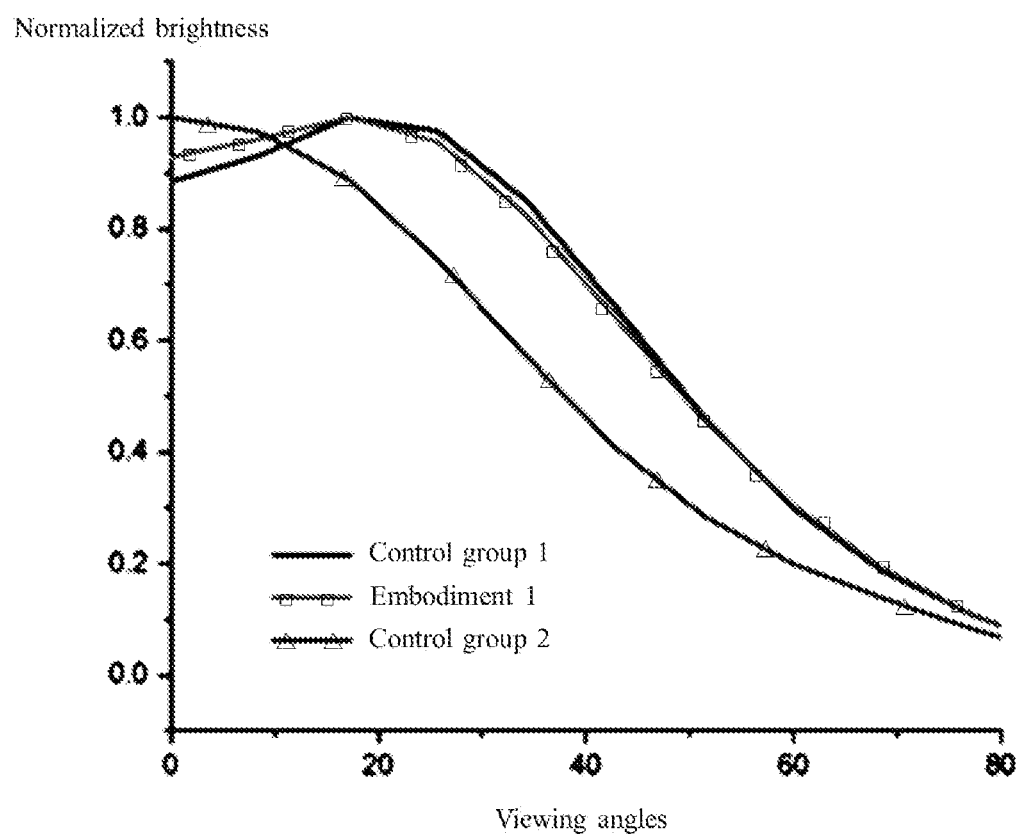
FIG. 5 is a comparison chart of viewing angle brightness curves of the display device of Embodiment 1, control group 1, and control group 2.

As shown in FIG. 5 and Table 1, on a cross-section perpendicular to the first direction X, the display device in Embodiment 1, wherein the protrusions 712 include an isosceles trapezoid-shaped first protrusion 7121 and an arc-shaped second protrusion 7122. The second film layer of the display device in control group 1 is only provided with trapezoidal protrusions. The display device in control group 2 is not provided with the viewing angle widening film.

The brightness of the present embodiment (Embodiment 1) with a viewing angle of 0° is 0.37, and the brightness of control group 1 with a viewing angle of 0° is 0.35. The protrusions 712 in this embodiment include the first protrusions 7121 and the second protrusions 7122 connected to the side of the first protrusions 7121 away from the flat layer 711. The surface of the side of the second protrusion 7122 away from the flat layer 711 is an arc structure. The angles between a tangent of the arc surface on the side of the second protrusion 7122 away from the flat layer 711 and a plane of the second protrusion 7122 on a side close to the flat layer 711 are less than the angles of the lower bottom corner of the first protrusion 7121. The diffusion effect of the second protrusion 7122 is weaker than that of the first protrusion 7121. Compared with the viewing angle widening film in the prior art that only provides trapezoidal protrusions, the viewing angle widening film 7 of this embodiment can improve the brightness when the viewing angle is 0°.

When the brightness of the display device 100 in this embodiment (Embodiment 1) is ½ of the normalized brightness, the viewing angle is 98 degrees. The viewing angle of the display device 100 in control group 2 when the brightness is ½ of the normalized brightness is 76 degrees. Therefore, the display device 100 of the present embodiment has a wider viewing angle after the viewing angle widening film 7 is provided.

TABLE 1

| Embodiments | $H_1$ | $H_2$ | $H_3$ | $H_4$ | $L_1$ | $L_2$ | $L_3$ | α | Viewing angles at ½ normalized brightness | Brightness at viewing angle of 0° |
|---|---|---|---|---|---|---|---|---|---|---|
| Embodiment 1 | 13.5 | 1.5 | 10 | 10 | 5.4 | 18 | 20 | 65° | 98° | 0.37 |
| Control group 1 | 15 | / | 10 | 10 | 4 | 18 | 20 | 65° | 99° | 0.35 |
| Control group 2 | / | / | / | / | / | / | / | / | 76° | 0.51 |

Figure 6:
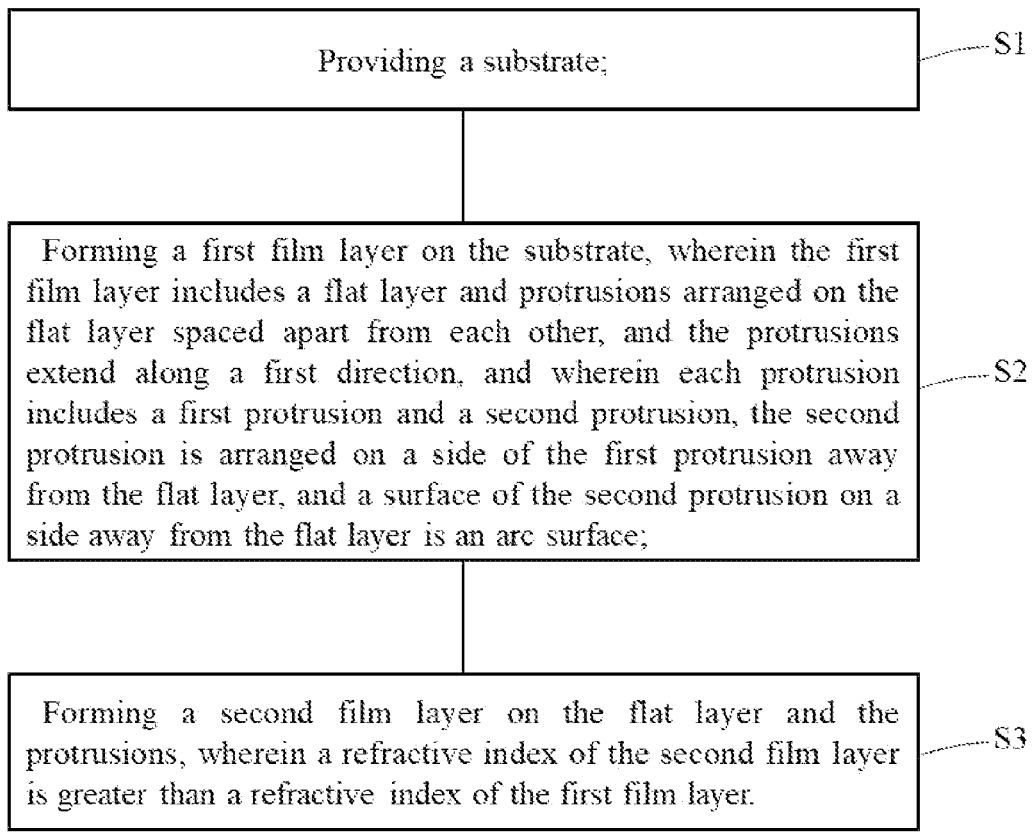
FIG. 6 is a flow chart of the manufacture of the viewing angle widening film according to Embodiment 1 of the present invention.

As shown in FIG. 6, this embodiment further provides a manufacturing method of the viewing angle widening film 7, which includes the following steps: S1, providing a substrate; S2, forming a first film layer 71 on the substrate, wherein the first film layer 71 includes a flat layer 711 and protrusions 712 arranged on the flat layer 711 spaced apart from each other, and the protrusions 712 extend along a first direction, and wherein each protrusion 712 includes a first protrusion 7121 and a second protrusion 7122, the second protrusion 7122 is arranged on a side of the first protrusion 7121 away from the flat layer 711, and a surface of the second protrusion 7122 on a side away from the flat layer 711 is an arc surface; and S3, forming a second film layer 72 on the flat layer 711 and the protrusions 712, wherein a refractive index of the second film layer 72 is greater than a refractive index of the first film layer 71.

Specifically, step S2 includes forming the flat layer 711 by coating the first resin on the substrate with a coater and curing it. The coating method includes one of slot coating, spin coating, or blade coating.

Specifically, S2 further includes coating the first resin on the light-emitting surface 7112 of the flat layer 711 by a coater. After a patterning process of exposure and development, a plurality of protrusions 712 which are spaced apart from each other and extend along the first direction X are obtained. The coating method includes one of slot coating, spin coating, or blade coating.

Specifically, step S3 includes coating a second resin on the flat layer 711 and the protrusions 712 by a coater and cured to form a second film layer 72. The coating methods include slit coating, spin coating, or blade coating.

As described above, in manufacturing the viewing angle widening film 7 by the coating method, various sizes of the viewing angle widening film 7 can be manufactured according to the user's needs, which meets the user's demand for a large-sized viewing angle widening film 7. When manufacturing the viewing angle widening films 7 of different sizes, it is not necessary to replace the coating equipment, which can reduce the cost.

A viewing angle widening film, a manufacturing method thereof, and a display device provided by the present application have been introduced in detail above. The principles and implementations of the present application are described herein using specific examples, and the descriptions of the above embodiments are only used to help understand the methods and core ideas of the present application. In addition, for one skill in the art, according to the idea of the present application, there will be changes in the specific embodiments and the scope of application. In conclusion, the content of this specification should not be construed as a limitation on the present application.

What is claimed is:

1. A viewing angle widening film, comprising:
a first film layer comprising a flat layer and a plurality of protrusions from the flat layer, wherein the protrusions are spaced apart from each other, each of the protrusions extends along a first direction and comprises a base portion and an arch top portion, a bottom surface of the base portion is joined to a surface of the flat layer, and a top surface of the base portion serves as a bottom surface of the arch top portion; and
a second film layer covering the flat layer and the protrusions, wherein a refractive index of the second film layer is greater than a refractive index of the first film layer,
wherein on a cross-section perpendicular to the first direction, a shape of the base portion is an isosceles trapezoid, a shape of the arch top portion is an arch comprising an arc and a chord subtending the arc, a slope of a tangent line of the arc at a left one of every two adjacent points is greater than a slope of a tangent line of the arc at a right one of the every two adjacent points, and an angle between a tangent line of the arc at any point and the chord is less than a lower base angle of the isosceles trapezoid, so that a diffusion effect of the arch top portion on light is weaker than a diffusion effect of the base portion on light.

2. The viewing angle widening film of claim 1, wherein a length of a top side of the isosceles trapezoid away from the flat layer ranges from 5 micrometers to 40 micrometers, a length of a bottom side of the isosceles trapezoid connecting the flat layer ranges from 8 micrometers to 50 micrometers, a height of the base portion ranges from 5 micrometers to 30 micrometers, and the lower base angle of the isosceles trapezoid is greater than 0° and less than 75°.

3. The viewing angle widening film of claim 2, wherein a height of the arch top portion ranges from 1 micrometer to 20 micrometers, and the length of the top side of the isosceles trapezoid is greater than the height of the arch top portion.

4. The viewing angle widening film of claim 3, wherein a minimum distance between the arc and a surface of the second film layer on a side away from the flat layer ranges from 5 micrometers to 30 micrometers.

5. The viewing angle widening film of claim 1, wherein the refractive index of the first film layer ranges from 1.3 to 1.6, and the refractive index of the second film layer ranges from 1.5 to 1.9.

6. The viewing angle widening film of claim 1, wherein light transmittance of the first film layer and light transmittance of the second film layer both range from 60% to 95%.

7. The viewing angle widening film of claim 1, wherein the first film layer and/or the second film layer further comprise scattering particles, shapes of the scattering particles are spherical, and diameters of the scattering particles range from 0.05 micrometers to 2 micrometers.

8. The viewing angle widening film of claim 1, wherein a material of the second film layer comprises a second resin, and the second film layer further comprises refractive index adjusting particles, and wherein a refractive index of the refractive index adjusting particles is greater than a refractive index of the second resin, and diameters of the refractive index adjusting particles range from 1 nanometer to 40 nanometers.

9. A manufacturing method of a viewing angle widening film, comprising:
providing a substrate;
forming a first film layer on the substrate, wherein the first film layer comprises a flat layer and a plurality of protrusions from the flat layer, wherein the protrusions are spaced apart from each other, each of the protrusions extends along a first direction and comprises a base portion and an arch top portion, a bottom surface of the base portion is joined to a surface of the flat layer, and a top surface of the base portion serves as a bottom surface of the arch top portion; and
forming a second film layer on the flat layer and the protrusions, wherein a refractive index of the second film layer is greater than a refractive index of the first film layer,
wherein on a cross-section perpendicular to the first direction, a shape of the base portion is an isosceles trapezoid, a shape of the arch top portion is an arch comprising an arc and a chord subtending the arc, a slope of a tangent line of the arc at a left one of every two adjacent points is greater than a slope of a tangent line of the arc at a right one of the every two adjacent points, and an angle between a tangent line of the arc at any point and the chord is less than a lower base angle of the isosceles trapezoid, so that a diffusion effect of the arch top portion on light is weaker than a diffusion effect of the base portion on light.

10. A display device, comprising:
a display panel;
a polarizer arranged on the display panel; and
a viewing angle widening film arranged between the display panel and the polarizer or arranged on a surface of the polarizer facing away from the display panel,
wherein the viewing angle widening film comprises:
a first film layer comprising a flat layer and a plurality of protrusions the flat layer, wherein the protrusions are spaced apart from each other, each of the protrusions extends along a first direction and comprises a base portion and an arch top portion, a bottom surface of the base portion is joined to a surface of the flat layer, and a top surface of the base portion serves as a bottom surface of the arch top portion; and
a second film layer covering the flat layer and the protrusions, wherein a refractive index of the second film layer is greater than a refractive index of the first film layer,
wherein on a cross-section perpendicular to the first direction, a shape of the base portion is an isosceles trapezoid, a shape of the arch top portion is an arch comprising an arc and a chord subtending the arc, a slope of a tangent line of the arc at a left one of every two adjacent points is greater than a slope of a tangent line of the arc at a right one of the every two adjacent points, and an angle between a tangent line of the arc at any point and the chord is less than a lower base angle of the isosceles trapezoid, so that a diffusion effect of the arch top portion on light is weaker than a diffusion effect of the base portion on light.

11. The display device of claim 10, wherein a height of the arch top portion ranges from 1 micrometer to 20 micrometers, and a length of a top side of the isosceles trapezoid away from the flat layer is greater than the height of the arch top portion.

12. The display device of claim 11, wherein the length of the top side of the isosceles trapezoid ranges from 5 micrometers to 40 micrometers.

13. The display device of claim 12, wherein a length of a bottom side of the isosceles trapezoid connecting the flat layer ranges from 8 micrometers to 50 micrometers.

14. The display device of claim 13, wherein a height of the base portion ranges from 5 micrometers to 30 micrometers, and the lower base angle of the isosceles trapezoid is greater than 0° and less than 75°.

15. The display device of claim 10, wherein a minimum distance between the arc and a surface of the second film layer on a side away from the flat layer ranges from 5 micrometers to 30 micrometers.

16. The display device of claim 10, wherein the refractive index of the first film layer ranges from 1.3 to 1.6, and the refractive index of the second film layer ranges from 1.5 to 1.9.

17. The display device of claim 10, wherein light transmittance of the first film layer and light transmittance of the second film layer both range from 60% to 95%.

18. The display device of claim 10, wherein the first film layer and/or the second film layer further comprise scattering particles, shapes of the scattering particles are spherical, and diameters of the scattering particles range from 0.05 micrometers to 2 micrometers.

19. The display device of claim 10, wherein a material of the second film layer comprises a second resin, and the second film layer further comprises refractive index adjusting particles, and wherein a refractive index of the refractive index adjusting particles is greater than a refractive index of the second resin, and diameters of the refractive index adjusting particles range from 1 nanometer to 40 nanometers.

* * * * *